No. 723,201. PATENTED MAR. 17, 1903.
E. M. HEYLMAN.
CORN PLANTER.
APPLICATION FILED JUNE 5, 1902.
NO MODEL. 3 SHEETS—SHEET 1.

Witnesses.
Ina Graham.
Nora Graham.

Inventor.
Edward M. Heylman,
by L. P. Graham
his attorney.

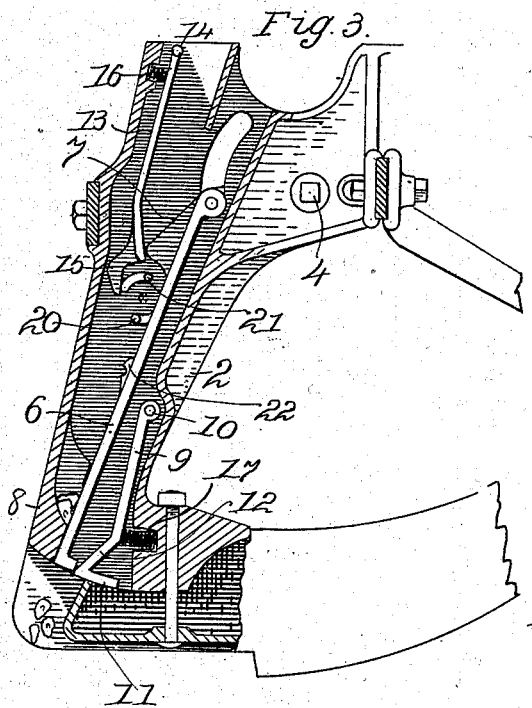
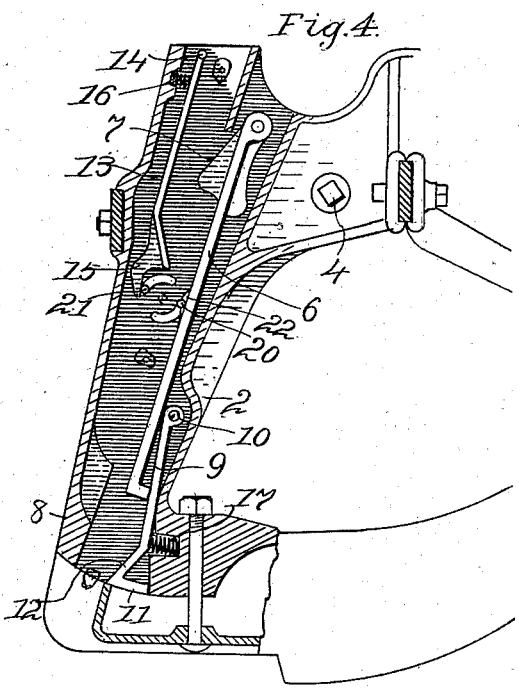
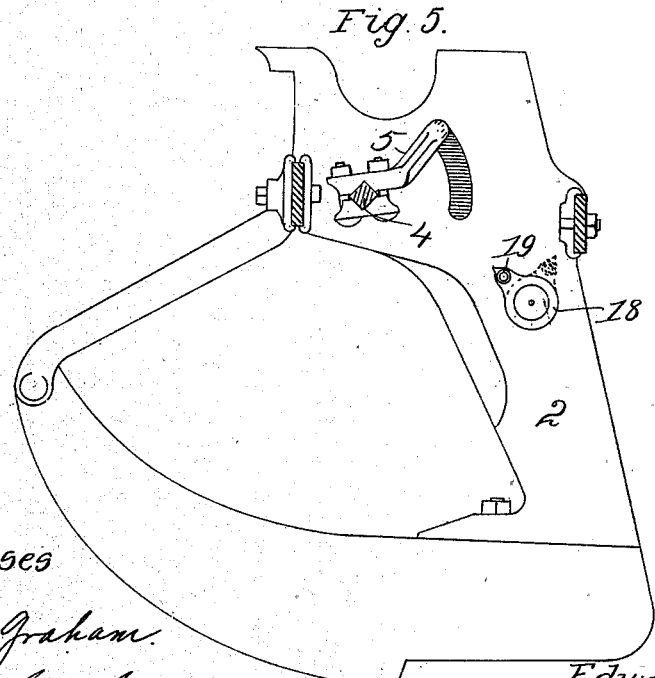

No. 723,201. PATENTED MAR. 17, 1903.
E. M. HEYLMAN.
CORN PLANTER.
APPLICATION FILED JUNE 5, 1902.
NO MODEL. 3 SHEETS—SHEET 3.

Witnesses
Ind Graham
Nra Graham

Inventor,
Edward M. Heylman
by L. P. Graham
his attorney.

UNITED STATES PATENT OFFICE.

EDWARD M. HEYLMAN, OF JANESVILLE, WISCONSIN, ASSIGNOR TO JANESVILLE MACHINE COMPANY, OF JANESVILLE, WISCONSIN, A CORPORATION OF WISCONSIN.

CORN-PLANTER.

SPECIFICATION forming part of Letters Patent No. 723,201, dated March 17, 1903.

Application filed June 5, 1902. Serial No. 110,381. (No model.)

*To all whom it may concern:*

Be it known that I, EDWARD M. HEYLMAN, of the city of Janesville, in the county of Rock and State of Wisconsin, have invented certain new and useful Improvements in Corn-Planters, of which the following is a specification.

These improvements comprise two inventions dependent upon each other and each contributing to the single result of dropping corn from a planter.

It is the object of one of the inventions to improve the mechanism in the seedbox whereby grains are separated from the mass of seed in the box, and it is the object of the other invention to improve the mechanism used to control the seed as it leaves the seedbox and properly deposit it in the furrows formed by the planter.

The inventions are exemplified in the structure hereinafter described, and they are defined in the appended claims.

Figure 1:
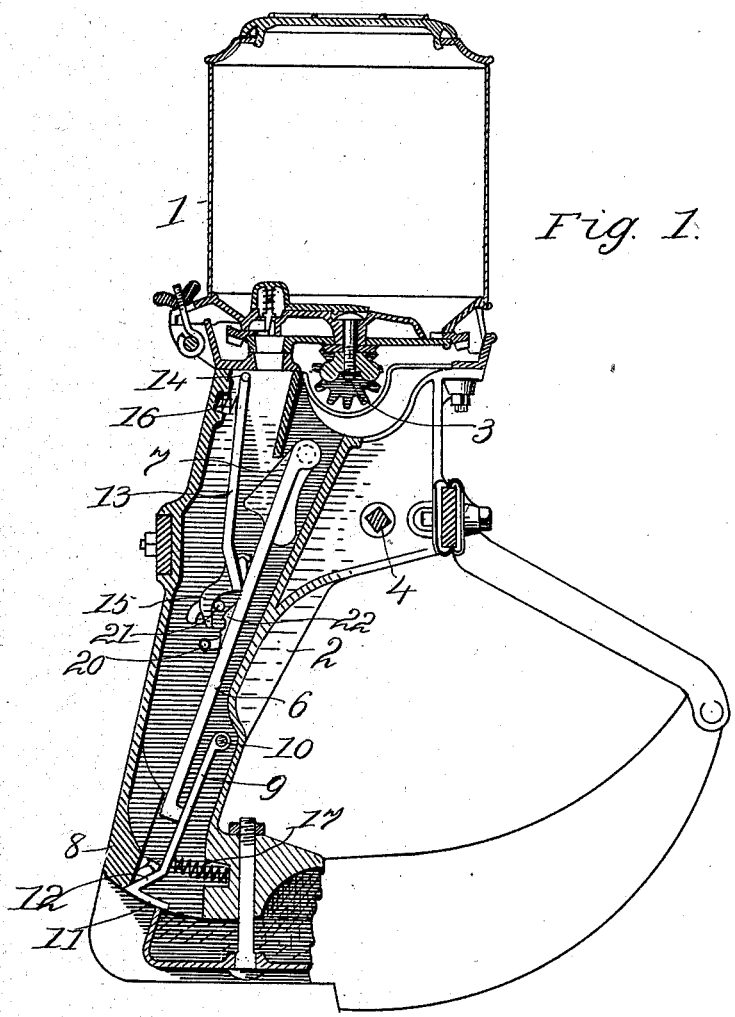
Figure 2:
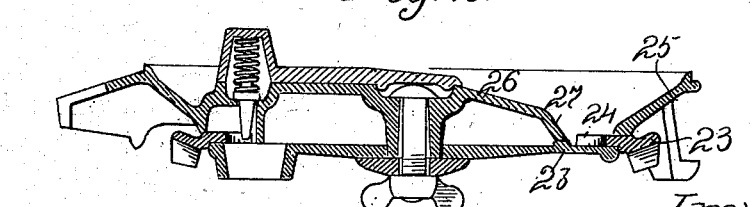
Figure 6:
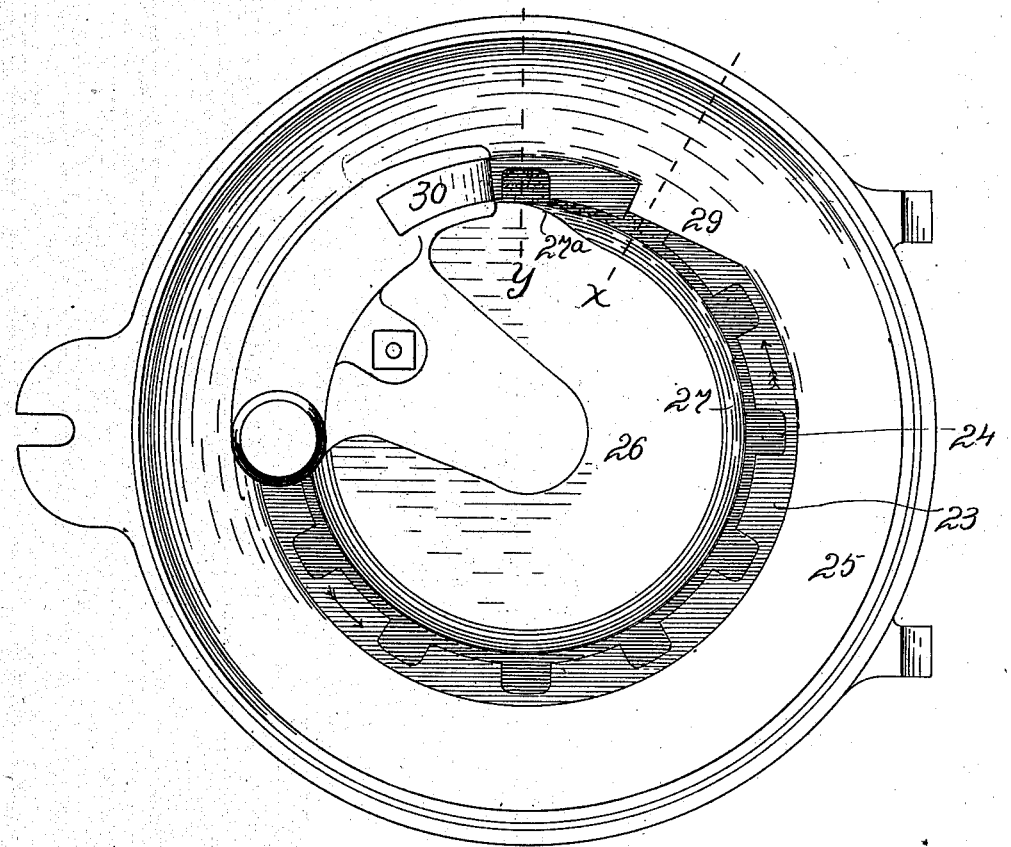
Figure 7:
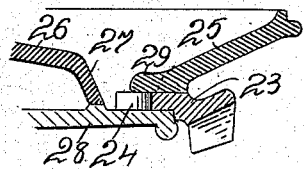
Figure 8:
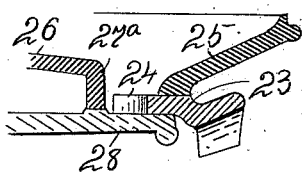

In the drawings forming part of this specification, Figure 1 is a section through a seedbox and a planter-shank, showing the second-drop mechanism in the position it occupies prior to depositing a hill of corn. Fig. 2 is a section through the first-drop mechanism, showing such mechanism on an enlarged scale. Fig. 3 is a section through a planter-shank, showing the second-drop mechanism in the position it occupies at the time a hill of corn is discharged. Fig. 4 is a section through a planter-shank, showing the second-drop mechanism so disposed as to convert the planter into a drill. Fig. 5 is a side elevation of a planter-shank, showing the arm that actuates the second-drop mechanism and also showing the shifting device used to convert the planter from a check-row machine to a drill and the reverse. Fig. 6 is an enlarged plan of the dropping mechanism of the seedbox. Fig. 7 is a detail section on line X in Fig. 6. Fig. 8 is a detail section on line Y in Fig. 6.

A seedbox is shown at 1, and a shank at 2.
The shaft that transmits motion to the first-drop mechanism is shown at 3, and the rock-shaft for the second-drop mechanism is shown at 4. An arm 5 (seen only in Fig. 5) is secured to rock-shaft 4, with its swinging end extended through a slot in the shank. A plunger 6 is pivotally connected with the swinging end of rock-arm 5, and it has a thin cam-flange 7, extending rearward from near its upper end, adjacent to a side wall of the shank. A valve 9 is pivoted at 10 in front of the lower part of the plunger, and a spring 17 tends to hold the lower end of valve 9 closed against the lower end 8 of the rear wall of the shank, as shown in Fig. 1. The lower end of valve 9 is inclined rearward, as shown at 12, and the extreme lower end of the valve is preferably curved forward in an arc of a circle drawn with pivot 10 for a center, as shown at 11. An intermediate valve 13 is pivoted at 14 in the upper end of the shank, and a spring 16 tends to hold the lower end of the intermediate valve closed against the plunger 6, as shown in Fig. 1. A finger 15 projects rearward and downward from the lower end of the intermediate valve, and the plunger 6 has a notched ledge 22, projecting rearward in approximate horizontal alinement with the finger 15 when the plunger is raised. A disk 18 (seen only in Fig. 5) has an outward-extending pin 19, by means of which it is shifted, and it also has a pair of pins 20 and 21, which extend through arc-formed slots in a side wall of the shank in position for one to engage the notch in ledge 22 and the other to press against finger 15 when the disk is turned to the position indicated by dotted lines in Fig. 5.

The seed-wheel 23 of the seedbox 1 is a ring having gear-teeth on its outer perimeter and also having seed-cells 24 in its inner surface. The seed-cells are notches cut through or formed in the inner edge of the seed-ring and they are open to receive seed moving either downward or outward. The outer ring 25 of the seedbox-bottom terminates immediately above the seed-ring outside the seed-cells, and it inclines inward and downward toward the cells. A bottom plate 28 supports the seed-ring and a central plate 26 has a beveled perimeter 27 concentric with the seed-ring and resting on the bottom plate inside the seed-cells. The outer ring 25 of the seedbox-bottom has at least one inclined extension 29, which projects partly over the seed-cells, and such incline is preferably located a short distance in front of the cut-off 30. Immediately in advance of the cut-off the bevel 27 turns gradually into an approximately vertical line, as shown at 27ª in Figs. 6 and 8.

The cells of the seed-ring are each of a size to receive a single grain of corn lying flatwise and the grains may settle into the cells through gravity or be directed into the open sides thereof by the incline 27. The seed-ring revolves in the direction indicated by arrows in Fig. 6, and as the cells pass under the inclined extension 29 grains standing edgewise are made to assume horizontal positions and if more than one grain is standing edgewise in a cell all but one are forced from the cell.

When planting in check-rows, a sufficient number of grains to constitute a hill are dropped consecutively from the seedbox into the shank and detained temporarily by the intermediate valve 13. When the check-row shaft 4 is rocked backward and the plunger 6 forced downward, as shown in Fig. 3, the cam-flange 7 forces the immediate valve open and permits the seed to fall into a pocket temporarily formed by the inner end of the plunger bearing against the rear wall 8 of the shank. As the plunger is raised by the rock-shaft the seed in the pocket formed by the plunger and the rear wall of the shank falls against the inclined end 12 of valve 9 preparatory to being discharged at a subsequent operation, and another hill is detained by the intermediate valve 13. (See Fig. 1.) The valve 9 is forced open by the plunger in expelling the seed, and the plunger forms a closure for the lower end of the shank while the valve is open, the intermediate valve closes against the plunger before the lower end of the plunger swings from contact with the rear wall of the shank, and there is never a time in the operation of the second-drop mechanism while planting in check-rows that there is a clear passage-way from the seedbox to the ground.

In order to convert the planter into a drill, the disk 18 is swung to the position shown in dotted lines in Fig. 5, with the result that the intermediate valve is pushed rearward by pin 21, bearing against finger 15, and the plunger is forced forward by pin 20. The swing of the lower end of the plunger is transmitted to valve 9 and a clear passage-way is formed for the corn from the hopper to the ground, as shown in Fig. 4. As pin 20 forces the plunger forward it rides into the notch in flange 22 and locks the disk against accidental releasing action. When it is desired to reconvert the planter into a check-row machine, the first downward motion of the plunger transmits motion to the disk through the pin 20 and the notch in flange 22 and leaves the disk in the position shown in solid lines in Fig. 5, while the pins occupy the positions shown in Figs. 1 and 3.

I claim—

1. In a first drop for planters, the combination of a seed-ring having cells formed in its inner surface, and a circular incline inside the circle of cells leading upward and inward from below the upper edges of the open sides of the cells.

2. In a first drop for planters, the combination of a seed-ring notched in its inner surface to form seed-cells, an incline inside the circle of cells to feed the grains obliquely into the open sides of the cells and another incline above and outside the cells to feed the grains downward into the cells.

3. In a first drop for planters, the combination of a seed-ring notched in its inner surface to form seed-cells, an incline inside the circle of cells, a cover for the ring outside the cells and an extension of the cover projecting partly over the path of the cells.

4. In a second drop for planters, the combination of a shank, a plunger in the shank, a valve closable under the lower end of the shank, when the plunger is raised, an intermediate valve closable against the plunger, when the plunger is raised, and a cam extension on the plunger to force the intermediate valve open as the plunger forces the grain from the lower valve.

5. In a second drop for planters, the combination of a shank having a rear wall, a valve normally closing against the lower end of the rear wall of the shank and swinging forward in opening, and a plunger to force the valve open and discharge the grain from the shank.

6. In a second drop for planters, the combination of a shank having a rear wall, a valve in front of the rear wall of the shank, normally closing against the lower end of the wall, a plunger to force the lower valve open, an intermediate valve in the upper end of the shank in the rear of the plunger, and an extension on the plunger to engage the intermediate valve as the plunger descends.

7. In a second drop for planters, the combination of a shank, a rearwardly-closing lower valve, a forwardly-closing upper valve and means for pushing forward on the lower valve and rearward on the upper valve to form a passage-way for drilled corn.

8. In a second drop for planters, the combination of a shank, a lower valve closing rearward against the rear wall of the shank, a plunger pivoted at its upper end and resting at its lower end against the rear surface of the lower valve below the pivot of the valve, an upper valve closing forward against the plunger, and means for forcing the plunger forward and the upper valve rearward to open the two valves.

9. In a second drop for planters the combination of a shank, a lower valve closable at its lower end against the lower end of the rear wall of the shank, a plunger pivoted at its upper end and resting at its lower end against the rear surface of the lower valve below the pivot of the valve, an upper valve closing forward against the plunger, a finger on the lower end of the upper valve, a notched flange on the rear surface of the plunger, and a disk having a pin adapted to engage the finger of the upper valve and also having a pin adapted to bear against the flange of the plunger and enter the notch thereof, whereby the plunger and the lower valve are forced forward and the upper valve is forced rearward by rocking the disk.

10. In a second drop for planters the combination of a shank, a lower valve, an upper valve, a plunger adapted to open both valves, springs tending to close the valves, means for forcing the valves open to convert the planter into a drill, and a connection between the plunger and the valve-opening means whereby operative motion of the plunger permits the valves to swing closed.

In testimony whereof I sign my name in the presence of two subscribing witnesses.

EDWARD M. HEYLMAN.

Witnesses:
F. H. FARNSWORTH,
T. F. KELTY.